US011613602B2

(12) United States Patent
Takai et al.

(10) Patent No.: US 11,613,602 B2
(45) Date of Patent: Mar. 28, 2023

(54) (METH)ACRYLIC BLOCK COPOLYMER AND ACTIVE ENERGY RAY CURABLE COMPOSITION CONTAINING THE SAME

(71) Applicant: KURARAY CO., LTD., Kurashiki (JP)

(72) Inventors: Junya Takai, Tsukuba (JP); Kenji Shachi, Tsukuba (JP)

(73) Assignee: KURARAY CO., LTD., Kurashiki (JP)

( * ) Notice: Subject to any disclaimer, the term of this patent is extended or adjusted under 35 U.S.C. 154(b) by 349 days.

(21) Appl. No.: 16/763,730

(22) PCT Filed: Nov. 12, 2018

(86) PCT No.: PCT/JP2018/041808
§ 371 (c)(1),
(2) Date: May 13, 2020

(87) PCT Pub. No.: WO2019/098153
PCT Pub. Date: May 23, 2019

(65) Prior Publication Data
US 2020/0339724 A1    Oct. 29, 2020

(30) Foreign Application Priority Data

Nov. 15, 2017 (JP) .............................. JP2017-220122

(51) Int. Cl.
*C08F 299/00* (2006.01)
*C08F 293/00* (2006.01)
*C08F 297/02* (2006.01)

(52) U.S. Cl.
CPC .......... *C08F 299/00* (2013.01); *C08F 293/00* (2013.01); *C08F 297/026* (2013.01)

(58) Field of Classification Search
CPC ................ C08F 297/026; C08F 297/06; C08F 293/00; C08F 293/005
See application file for complete search history.

(56) References Cited

U.S. PATENT DOCUMENTS

| 3,957,750 | A | * | 5/1976 | MacLeay | C08F 4/04 526/204 |
|---|---|---|---|---|---|
| 5,264,527 | A | | 11/1993 | Varshney et al. | |
| 5,294,674 | A | | 3/1994 | Varshney et al. | |
| 5,591,816 | A | | 1/1997 | Varshney et al. | |
| 5,668,231 | A | | 9/1997 | Varshney et al. | |
| 5,763,548 | A | | 6/1998 | Matyjaszewski et al. | |
| 6,407,187 | B1 | | 6/2002 | Matyjaszewski et al. | |
| 6,512,060 | B1 | | 1/2003 | Matyjaszewski et al. | |
| 6,624,263 | B2 | | 9/2003 | Matyjaszewski et al. | |
| 7,250,479 | B2 | | 7/2007 | Le et al. | |
| 7,291,690 | B2 | | 11/2007 | Yamago et al. | |
| 7,615,601 | B2 | | 11/2009 | Yamago et al. | |
| 7,662,986 | B2 | | 2/2010 | Le et al. | |
| 7,666,962 | B2 | | 2/2010 | Le et al. | |
| 7,714,075 | B1 | | 5/2010 | Le et al. | |
| 9,562,128 | B2 | | 2/2017 | Niitani et al. | |
| 2002/0193538 | A1 | | 12/2002 | Matyjaszewski et al. | |
| 2004/0171777 | A1 | | 9/2004 | Le et al. | |
| 2006/0167199 | A1 | | 7/2006 | Yamago et al. | |
| 2008/0009597 | A1 | | 1/2008 | Yamago et al. | |
| 2008/0139764 | A1 | | 6/2008 | Le et al. | |
| 2008/0139836 | A1 | | 6/2008 | Le et al. | |
| 2014/0256884 | A1 | | 9/2014 | Niitani et al. | |

FOREIGN PATENT DOCUMENTS

| JP | 57-501430 A | 8/1982 |
|---|---|---|
| JP | 5-507737 A | 11/1993 |
| JP | 6-93060 A | 4/1994 |
| JP | 7-157522 A | 6/1995 |
| JP | 11-335432 A | 12/1999 |
| JP | 3040172 B2 | 3/2000 |
| JP | 3639859 B2 | 4/2005 |
| JP | 3839829 B2 | 11/2006 |
| JP | 2011-184678 A | 9/2011 |
| JP | 2013-87232 A | 5/2013 |
| TW | 201434936 A | 9/2014 |
| TW | I473825 B | 2/2015 |
| WO | WO 82/01006 A1 | 4/1982 |
| WO | WO 2004/013192 A1 | 2/2004 |
| WO | WO 2004/014926 A2 | 2/2004 |
| WO | WO 2013/141105 A1 | 9/2013 |

OTHER PUBLICATIONS

International Search Report dated Feb. 5, 2019 in PCT/JP2018/041808, 1 page.
English translation of the Written Opinion of the International Searching Authority dated Feb. 5, 2019 in PCT/JP2018/041808, 4 pages.
Combined Taiwanese Office Action and Search Report dated Jan. 17, 2022 in Taiwanese Patent Application No. 107140348 (with English translation of categories of cited documents), 7 pages.

* cited by examiner

*Primary Examiner* — Jeffrey C Mullis
(74) *Attorney, Agent, or Firm* — Oblon, McClelland, Maier & Neustadt, L.L.P.

(57) ABSTRACT

Provided are a (meth)acrylic block copolymer exhibiting good active energy ray curability, in particular, curability of a blend thereof with an acrylate monomer, and an active energy ray curable composition comprising the (meth)acrylic block copolymer. The (meth)acrylic block copolymer includes a methacrylic polymer block (A) having an active energy ray curable group including a partial structure represented by the general formula (1) below wherein $R^1$ denotes a hydrocarbon group having 1 to 10 carbon atoms, and W denotes a saturated hydrocarbon group having 1 to 10 carbon atoms, and an acrylic polymer block (B) having no active energy ray curable groups.

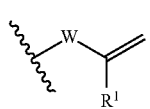

(1)

9 Claims, No Drawings

(METH)ACRYLIC BLOCK COPOLYMER AND ACTIVE ENERGY RAY CURABLE COMPOSITION CONTAINING THE SAME

TECHNICAL FIELD

The present invention relates to a (meth) acrylic block copolymer having a specific active energy ray curable group, and to an active energy ray curable composition containing the (meth) acrylic block copolymer.

BACKGROUND ART

Active energy ray curable compositions are conventionally known which are cured when irradiated with active energy rays such as UV lights or electron beams. Such curable compositions are used in applications including adhesives, pressure-sensitive adhesives, paints, inks, coating materials and stereolithographic materials.

On the other hand, (meth) acrylic block copolymers including a methacrylic polymer block and an acrylic polymer block have excellent properties such as adhesion, shaping properties and weather resistance. These characteristics are expected to broaden the use of the copolymers to applications such as pressure-sensitive adhesives, adhesives, coating materials and various shaping materials.

Further, the combined properties of the above types of materials are exhibited by (meth) acrylic block copolymers which include a methacrylic polymer block and an acrylic polymer block and have an active energy ray curable functional group that is activated by irradiation with active energy rays or is activated by a photoinitiator activated by such irradiation (hereinafter, such a functional group is written as the "active energy ray curable group") (see Patent Document 1). For example, such (meth) acrylic block copolymers may be obtained by forming an acrylic polymer block by the polymerization of butyl acrylate, and copolymerizing methyl methacrylate and allyl methacrylate to introduce allyl groups which serve as the active energy ray curable groups.

CITATION LIST

Patent Literature

Patent Document 1: JP-A-2011-184678

SUMMARY OF INVENTION

Technical Problem

A challenge encountered by active energy ray curable compositions is the enhancement in curing rate when the compositions are irradiated with active energy rays. The curing rate is dependent on the structure of active energy ray curable groups. Of the active energy ray curable groups, allyl groups are known to be relatively low in reactivity. In particular, such groups, when present in acrylate monomer compositions used in various applications such as adhesives, pressure-sensitive adhesives, paints, inks and coating materials, exhibit a markedly low curing rate.

The present invention has been made based on the circumstances discussed above. It is therefore an object of the present invention to provide a (meth) acrylic block copolymer exhibiting excellent active energy ray curability, and an active energy ray curable composition containing the (meth) acrylic block copolymer.

Solution to Problem

The present inventors carried out extensive studies directed to solving the problems described above. As a result, the present inventors have found that a (meth) acrylic block copolymer having a specific active energy ray curable group exhibits good curability, and have completed the present invention based on the finding and further studies.

That is, the present invention pertains to:

[1] A (meth) acrylic block copolymer including a methacrylic polymer block (A) having an active energy ray curable group including a partial structure (1) represented by the general formula (1) below, and an acrylic polymer block (B) having no active energy ray curable groups;

[Chem. 1]

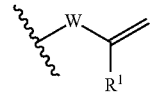

(1)

wherein $R^1$ denotes a hydrocarbon group having 1 to 10 carbon atoms, and W denotes a saturated hydrocarbon group having 1 to 10 carbon atoms.

[2] The (meth) acrylic block copolymer described in [1], wherein the proportion of the number of moles of the partial structures (1) relative to the number of moles of all monomer units constituting the methacrylic polymer block (A) is 0.1 to 50 mol %.

[3] An active energy ray curable composition including the (meth) acrylic block copolymer described in [1] or [2].

Advantageous Effects of Invention

The (meth) acrylic block copolymers provided according to the present invention exhibit excellent active energy ray curability. The active energy ray curable compositions contain the (meth) acrylic block copolymers. Cured products of these materials are also provided.

DESCRIPTION OF EMBODIMENTS

The present invention will be described in detail hereinbelow.

In the present specification, the term "(meth) acrylic" is a general term indicating both "methacrylic" and "acrylic".

A (meth) acrylic block copolymer of the present invention includes a methacrylic polymer block (A) which has an active energy ray curable group including a partial structure (1), and an acrylic polymer block (B) which has no active energy ray curable groups.

Methacrylic Polymer Blocks (A)

The methacrylic polymer block (A) has an active energy ray curable group which includes a partial structure (1) represented by the following general formula (1).

[Chem. 2]

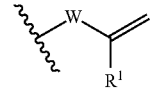

(1)

In the formula, $R^1$ denotes a hydrocarbon group having 1 to 10 carbon atoms, and W denotes a saturated hydrocarbon group having 1 to 10 carbon atoms.

The active energy ray curable groups including a partial structure (1) exhibit polymerizability when irradiated with active energy rays. As a result of this polymerizability, the (meth) acrylic block copolymer of the invention or an active energy ray curable composition containing the copolymer is cured into a cured product by the application of active energy rays. In the present specification, the term active energy rays means light rays, electromagnetic waves, particle rays and combinations thereof. Examples of the light rays include far-ultraviolet lights, ultraviolet lights (UV), near-ultraviolet lights, visible lights and infrared lights. Examples of the electromagnetic waves include X-rays and γ-rays. Examples of the particle rays include electron beams (EB), proton beams (α beams) and neutron beams. Of these active energy rays, ultraviolet lights and electron beams are preferable from points of view such as curing rate, and the availability and price of irradiators, with ultraviolet lights being more preferable.

In the general formula (1), $R^1$ denotes a hydrocarbon group having 1 to 10 carbon atoms. Here, the hydrocarbon group represented by R1 is a monovalent hydrocarbon group having no double bonds or triple bonds. Examples of the hydrocarbon groups with 1 to 10 carbon atoms denoted by $R^1$ include, for example, alkyl groups such as methyl group, ethyl group, n-propyl group, isopropyl group, n-butyl group, isobutyl group, sec-butyl group, t-butyl group, 2-methylbutyl group, 3-methylbutyl group, 2-ethylbutyl group, 2,2-dimethylbutyl group, 2,3-dimethylbutyl group, n-pentyl group, neopentyl group, n-hexyl group, 2-methylpentyl group, 3-methylpentyl group and n-decyl group; cycloalkyl groups such as cyclopropyl group, cyclobutyl group, cyclopentyl group and cyclohexyl group; aryl groups such as phenyl group and naphthyl group; and aralkyl groups such as benzyl group and phenylethyl group. From the point of view of active energy ray curability, $R^1$ is preferably a saturated hydrocarbon group having 1 to 6 carbon atoms, more preferably a saturated hydrocarbon group having 1 to 2 carbon atoms, and still more preferably a methyl group. The active energy ray curable groups including a partial structure (1) exhibit higher reactivity and attain enhanced active energy ray curability probably as a result of $R^1$ being an electron-donating hydrocarbon group, not a hydrogen atom.

In the general formula (1), W denotes a saturated hydrocarbon group having 1 to 10 carbon atoms. Here, the saturated hydrocarbon group represented by W is a divalent hydrocarbon group having no double bonds or triple bonds. W maybe linear, branched or cyclic, preferably linear or branched, and more preferably linear. Examples of W include ethane-1,1-diyl group, ethane-1,2-diyl group, propane-1,1-diyl group, propane-1,2-diyl group, propane-1,3-diyl group, pentane-1,5-diyl group, hexane-1,6-diyl group and cyclohexane-1,4-diyl group. From the point of view of active energy ray curability, W is preferably a saturated hydrocarbon group having 2 to 6 carbon atoms, more preferably a saturated hydrocarbon group having 2 carbon atoms, and particularly preferably an ethane-1,2-diyl group.

From the point of view of active energy ray curability, the proportion of the number of moles of the partial structures (1) relative to the number of moles of all the monomer units constituting the methacrylic polymer block (A) is preferably in the range of not less than 0.1 mol % and not more than 50 mol %, more preferably in the range of not less than 0.5 mol % and not more than 40 mol %, and still more preferably in the range of not less than 1.0 mol % and not more than 30 mol %.

The active energy ray curable groups including a partial structure (1) may be present at a terminal or in a side chain of the methacrylic polymer block (A). To attain a preferred proportion of the partial structures (1) that are introduced, it is preferable that the groups be present at least in side chains.

The methacrylic polymer block (A) preferably includes monomer units which are derived from a methacrylate ester represented by the general formula (2) below. When a methacrylate ester represented by the general formula (2) is used, the methacryloyl groups are selectively polymerized by living anionic polymerization under conditions which will be described later to form a methacrylic polymer block (A) which has an active energy ray curable group including a partial structure (1).

[Chem. 3]

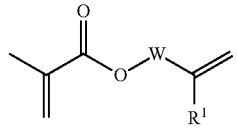

(2)

In the formula, $R^1$ denotes a hydrocarbon group having 1 to 10 carbon atoms, and W denotes a saturated hydrocarbon group having 1 to 10 carbon atoms.

Specific examples of the general formula (2) include 3-methyl-3-butenyl methacrylate, 4-methyl-4-pentenyl methacrylate, 5-methyl-5-hexenyl methacrylate, 6-methyl-6-heptenyl methacrylate, 7-methyl-7-octenyl methacrylate, 3-ethyl-3-butenyl methacrylate, 4-ethyl-4-pentenyl methacrylate, 5-ethyl-5-hexenyl methacrylate, 6-ethyl-6-heptenyl methacrylate and 7-ethyl-7-octenyl methacrylate. Of these, 3-methyl-3-butenyl methacrylate, 4-methyl-4-pentenyl methacrylate, 5-methyl-5-hexenyl methacrylate, 6-methyl-6-heptenyl methacrylate and 7-methyl-7-octenyl methacrylate are preferable, and 3-methyl-3-butenyl methacrylate is more preferable. The methacrylate esters may be used singly, or two or more may be used in combination.

From the point of view of active energy ray curability, the proportion of the number of moles of the monomer units derived from the methacrylate ester of the general formula (2) relative to the number of moles of all the monomer units constituting the methacrylic polymer block (A) is preferably in the range of not less than 0.1 mol % and not more than 50 mol %, more preferably in the range of not less than 0.5 mol % and not more than 40 mol %, and still more preferably in the range of not less than 1.0 mol % and not more than 30 mol %.

In addition to the monomer units from the methacrylate ester represented by the general formula (2), the methacrylic polymer block (A) preferably includes monomer units derived from a monofunctional methacrylate ester having one methacryloyl group.

Examples of the monofunctional methacrylate esters having one methacryloyl group include, for example, methyl methacrylate, ethyl methacrylate, n-propyl methacrylate, isopropyl methacrylate, n-butyl methacrylate, t-butyl methacrylate, cyclohexyl methacrylate, 2-ethylhexyl methacrylate, isobornyl methacrylate, dodecyl methacrylate, 2-methoxyethyl methacrylate, 2-hydroxyethyl methacrylate, 2-hydroxybutyl methacrylate, trimethoxysilylpropyl methacrylate, 2-aminoethyl methacrylate, N,N-dimethylaminoethyl methacrylate, N,N-diethylaminoethyl methacrylate, phenyl methacrylate, naphthyl methacrylate, 2-(trimethylsilyloxy) ethyl methacrylate, 3-(trimethylsilyloxy) propyl methacrylate, glycidyl methacrylate, γ-(methacryloyloxypropyl) trimethoxysilane, ethylene oxide adduct of methacrylic acid, trifluoromethylmethyl methacrylate, 2-trifluoromethylethyl methacrylate, 2-perfluoroethylethyl methacrylate, 2-perfluoroethyl-2-perfluorobutylethyl methacrylate, 2-perfluoroethyl methacrylate, perfluoromethyl methacrylate, diperfluoromethylmethyl methacrylate, 2-perfluoromethyl-2-perfluoroethylmethyl methacrylate, 2-perfluorohexylethyl methacrylate, 2-perfluorodecylethyl methacrylate and 2-perfluorohexadecylethyl methacrylate. Of these, alkyl methacrylates having an alkyl group with 1 to 5 carbon atoms, such as methyl methacrylate, ethyl methacrylate, n-propyl methacrylate, isopropyl methacrylate, n-butyl methacrylate and t-butyl methacrylate, are preferable. Methyl methacrylate is more preferable.

The content of the monomer units derived from the monofunctional methacrylate ester having one methacryloyl group (for example, methyl methacrylate) is preferably not less than 30 mass % relative to all the monomer units in the methacrylic polymer block (A), and is more preferably not less than 40 mass %, and still more preferably not less than 50 mass %.

Further, the proportion of the number of moles of the monomer units derived from the monofunctional methacrylate ester having one methacryloyl group (for example, methyl methacrylate) is preferably in the range of not less than 50 mol % and not more than 99.9 mol %, and more preferably in the range of not less than 60 mol % and not more than 99.5 mol % relative to the number of moles of all the monomer units in the methacrylic polymer block (A).

The methacrylic polymer block (A) may include monomer units derived from an additional monomer other than the methacrylate esters represented by the general formula (2) and the monofunctional methacrylate esters having one methacryloyl group. Examples of such additional monomers include, for example, acrylate esters such as methyl acrylate, ethyl acrylate, n-propyl acrylate, isopropyl acrylate, n-butyl acrylate, t-butyl acrylate, cyclohexyl acrylate, 2-ethylhexyl acrylate, isobornyl acrylate, dodecyl acrylate, 2-methoxyethyl acrylate, 2-hydroxyethyl acrylate, 2-hydroxybutyl acrylate, trimethoxysilylpropyl acrylate, 2-aminoethyl acrylate, N,N-dimethylaminoethyl acrylate, N,N-diethylaminoethyl acrylate, phenyl acrylate, naphthyl acrylate, 2-(trimethylsilyloxy) ethyl acrylate, 3-(trimethylsilyloxy) propyl acrylate, glycidyl acrylate, γ-(acryloyloxypropyl) trimethoxysilane, ethylene oxide adduct of acrylic acid, trifluoromethylmethyl acrylate, 2-trifluoromethylethyl acrylate, 2-perfluoroethylethyl acrylate, 2-perfluoroethyl-2-perfluorobutylethyl acrylate, 2-perfluoroethyl acrylate, perfluoromethyl acrylate, diperfluoromethylmethyl acrylate, 2-perfluoromethyl-2-perfluoroethylmethyl acrylate, 2-perfluorohexylethyl acrylate, 2-perfluorodecylethyl acrylate and 2-perfluorohexadecylethyl acrylate; α-alkoxyacrylate esters such as methyl α-methoxyacrylate and methyl α-ethoxyacrylate; crotonate esters such as methyl crotonate and ethyl crotonate; 3-alkoxyacrylate esters such as 3-methoxyacrylate esters; (meth) acrylamides such as N-isopropyl (meth) acrylamide, N-t-butyl (meth) acrylamide, N,N-dimethyl (meth) acrylamide and N,N-diethyl (meth) acrylamide; methyl 2-phenylacrylate, ethyl 2-phenylacrylate, n-butyl 2-bromoacrylate, methyl 2-bromomethylacrylate, ethyl 2-bromomethylacrylate, methyl vinyl ketone, ethyl vinyl ketone, methyl isopropenyl ketone and ethyl isopropenyl ketone. The additional monomers may be used singly, or two or more may be used in combination.

The content of the monomer units derived from the additional monomer is preferably not more than 10 mass %, and more preferably not more than 5 mass % relative to all the monomer units in the methacrylic polymer block (A). When the (meth) acrylic block copolymer contains a plurality of methacrylic polymer blocks (A), the content of the monomer units derived from the additional monomer is, in a desired embodiment, preferably not more than 10 mass %, and more preferably not more than 5 mass % in each of the polymer blocks.

The number average molecular weight of the methacrylic polymer block (A) is, although not particularly limited, preferably in the range of not less than 500 and not more than 100,000, and more preferably in the range of not less than 1,000 and not more than 50,000 from points of view such as the handleability, viscosity and mechanical characteristics of the (meth) acrylic block copolymer that is obtained. When the (meth) acrylic block copolymer contains a plurality of methacrylic polymer blocks (A), the number average molecular weight of each of the polymer blocks is preferably in the above range.

In the present specification, the number average molecular weight and the weight average molecular weight described later are values measured by gel permeation chromatography (GPC) (relative to standard polystyrenes).

The content of the methacrylic polymer block (A) in the (meth) acrylic block copolymer of the present invention is not particularly limited, but is preferably not less than 1 mass % and not more than 70 mass %, more preferably not less than 1 mass % and not more than 60 mass %, and still more preferably not less than 2 mass % and not more than 50 mass %. When the content is 70 mass % or less, cured products obtained by curing the (meth) acrylic block copolymer of the invention tend to attain excellent flexibility. When the content is 1 mass % or above, the (meth) acrylic block copolymer of the invention tends to exhibit excellent curing rate when irradiated with active energy rays. In the case where the (meth) acrylic block copolymer includes a plurality of methacrylic polymer blocks (A), it is preferable that the total content of all the methacrylic polymer blocks (A) satisfy the above value.

Acrylic Polymer Blocks (B)

The (meth) acrylic block copolymer includes an acrylic polymer block (B) having no active energy ray curable groups.

In the present specification, the active energy ray curable groups mean functional groups which exhibit polymerizability when irradiated with the active energy rays described hereinabove. Examples of the active energy ray curable groups include, for example, functional groups having an ethylenic double bond (in particular, an ethylenic double bond represented by the general formula CH2=CR— (wherein R is an alkyl group or a hydrogen atom)) such as the partial structure (1) described hereinabove, methallyl group, allyl group, (meth) acryloyl group, vinyl group, vinyloxy group, 1,3-dienyl group and styryl group; and functional groups including an epoxy group, an oxetanyl group, a thiol group, a maleimide group, etc.

The acrylic polymer block (B) preferably includes monomer units derived from an acrylate ester.

Examples of the acrylate esters include, for example, monoacrylate esters such as methyl acrylate, ethyl acrylate, n-propyl acrylate, isopropyl acrylate, n-butyl acrylate, t-butyl acrylate, n-hexyl acrylate, n-heptyl acrylate, 2-ethylhexyl acrylate, n-octyl acrylate, isooctyl acrylate, isobornyl acrylate, dodecyl acrylate, cyclohexyl acrylate, 2-methoxyethyl acrylate, 2-methoxypropyl acrylate, 3-methoxypropyl acrylate, 2-methoxybutyl acrylate, 4-methoxybutyl acrylate, 2-ethoxyethyl acrylate, 3-ethoxypropyl acrylate, 4-ethoxybutyl acrylate, methoxydiethylene glycol acrylate, ethoxydiethylene glycol acrylate, methoxytriethylene glycol acrylate, ethoxytriethylene glycol acrylate, methoxydipropylene glycol acrylate, ethoxydipropylene glycol acrylate, methoxytripropylene glycol acrylate, ethoxytripropylene glycol acrylate, trimethoxysilylpropyl acrylate, N,N-dimethylaminoethyl acrylate, N,N-diethylaminoethyl acrylate, phenyl acrylate, naphthyl acrylate, 2-(trimethylsilyloxy) ethyl acrylate and 3-(trimethylsilyloxy) propyl acrylate. Of these, alkyl acrylates having an alkyl group with 4 or more carbon atoms, such as n-butyl acrylate, t-butyl acrylate, 2-ethylhexyl acrylate, dodecyl acrylate and n-octyl acrylate, and 2-methoxyethyl acrylate are preferable. 2-Ethylhexyl acrylate, n-butyl acrylate and 2-methoxyethyl acrylate are more preferable. The acrylate esters may be used singly, or two or more may be used in combination.

The content of the monomer units derived from the acrylate ester is preferably not less than 90 mass % relative to all the monomer units in the acrylic polymer block (B), and is more preferably not less than 95 mass %, and may be 100 mass %.

The acrylic polymer block (B) may include monomer units derived from an additional monomer other than the acrylate esters described above. Examples of such additional monomers include alkyl methacrylates such as methyl methacrylate, ethyl methacrylate, n-propylmethacrylate, isopropyl methacrylate, n-butyl methacrylate, t-butyl methacrylate, cyclohexyl methacrylate, 2-ethylhexyl methacrylate, isobornyl methacrylate and dodecyl methacrylate; methacrylate esters such as 2-methoxyethyl methacrylate, 2-hydroxyethyl methacrylate, 2-hydroxybutyl methacrylate, trimethoxysilylpropyl methacrylate, 2-aminoethyl methacrylate, N,N-dimethylaminoethyl methacrylate, N,N-diethylaminoethyl methacrylate, phenyl methacrylate, naphthyl methacrylate, 2-(trimethylsilyloxy) ethyl methacrylate, 3-(trimethylsilyloxy) propyl methacrylate, glycidyl methacrylate, γ-(methacryloyloxypropyl) trimethoxysilane, ethylene oxide adduct of methacrylic acid, trifluoromethylmethyl methacrylate, 2-trifluoromethylethyl methacrylate, 2-perfluoroethylethyl methacrylate, 2-perfluoroethyl-2-perfluorobutylethyl methacrylate, 2-perfluoroethyl methacrylate, perfluoromethyl methacrylate, diperfluoromethylmethyl methacrylate, 2-perfluoromethyl-2-perfluoroethylmethyl methacrylate, 2-perfluorohexylethyl methacrylate, 2-perfluorodecylethyl methacrylate and 2-perfluorohexadecylethyl methacrylate; α-alkoxyacrylate esters such as methyl α-methoxyacrylate and methyl α-ethoxyacrylate; crotonate esters such as methyl crotonate and ethyl crotonate; 3-alkoxyacrylate esters such as 3-methoxyacrylate esters; (meth) acrylamides such as N-isopropyl (meth) acrylamide, N-t-butyl (meth) acrylamide, N,N-dimethyl (meth) acrylamide and N,N-diethyl (meth) acrylamide; methyl vinyl ketone, ethyl vinyl ketone, methyl isopropenyl ketone and ethyl isopropenyl ketone. The additional monomers may be used singly, or two or more may be used in combination. The content of the monomer units derived from the additional monomer is preferably not more than 10 mass %, and more preferably not more than 5 mass % relative to all the monomer units in the acrylic polymer block (B).

The number average molecular weight of the acrylic polymer block (B) is, although not particularly limited, preferably in the range of 3,000 to 300,000, and more preferably in the range of 5,000 to 200,000 from points of view such as the handleability, viscosity and mechanical characteristics of the (meth) acrylic block copolymer that is obtained. When the (meth) acrylic block copolymer contains a plurality of acrylic polymer blocks (B), the number average molecular weight of each of the polymer blocks is preferably in the above range.

The content of the acrylic polymer block (B) in the (meth) acrylic block copolymer of the present invention is not particularly limited, but is preferably not less than 30 mass % and not more than 99 mass %, more preferably not less than 40 mass % and not more than 99 mass %, and still more preferably not less than 50 mass % and not more than 98 mass %. When the content is 30 mass % or above, cured products obtained by curing the (meth) acrylic block copolymer of the invention tend to attain excellent flexibility. When the content is 99 mass % or less, the (meth) acrylic block copolymer of the invention tends to exhibit excellent curing rate when irradiated with active energy rays. In the case where the (meth) acrylic block copolymer includes a plurality of acrylic polymer blocks (B), it is preferable that the total content of all the acrylic polymer blocks (B) satisfy the above value.

(Meth) Acrylic Block Copolymers

The number average molecular weight (Mn) of the (meth) acrylic block copolymer of the present invention is not particularly limited but, from points of view such as handleability, viscosity and mechanical characteristics, is preferably not less than 4,000 and up to 400,000, more preferably not less than 7,000 and not more than 200,000, and still more preferably not less than 10,000 and not more than 100,000. The molecular weight distribution (Mw/Mn), i.e., the weight average molecular weight (Mw)/number average molecular weight (Mn) of the (meth) acrylic block copolymer of the invention is preferably not more than 2.00, more preferably in the range of not less than 1.01 and not more than 2.00, still more preferably in the range of not less than 1.01 and not more than 1.80, and most preferably in the range of not less than 1.01 and not more than 1.50.

The (meth) acrylic block copolymer of the present invention is a block copolymer including at least one methacrylic polymer block (A) and at least one acrylic polymer block (B). The (meth) acrylic block copolymer may have an additional polymer block other than the methacrylic polymer block (A) and the acrylic polymer block (B). The numbers of the respective polymer blocks, and the order in which they are bonded are not particularly limited. From the point of view of active energy ray curability, it is preferable that the methacrylic polymer block (A) define at least one end of the (meth) acrylic block copolymer. From the point of view of the ease in the production of the (meth) acrylic block copolymer, the polymer is more preferably linear. In particular, the copolymer is more preferably a diblock copolymer composed of one methacrylic polymer block (A) and one acrylic polymer block (B) coupled together, or a triblock copolymer in which one methacrylic polymer block (A) is bonded to both ends of one acrylic polymer block (B).

The (meth) acrylic block copolymer of the invention may be produced by any method without limitation, but is preferably produced by anionic polymerization or radical polymerization. From the point of view of the control of polymerization, the copolymer is more preferably produced by living anionic polymerization or living radical polymerization, and is still more preferably produced by living anionic polymerization.

Examples of the living radical polymerization processes include polymerization using a chain transfer agent such as polysulfide, polymerization using a cobalt porphyrin complex, polymerization using a nitroxide (see WO 2004/014926), polymerization using a higher-period hetero element compound such as an organotellurium compound (see Japanese Patent No. 3839829), reversible addition-fragmentation chain transfer (RAFT) polymerization (see Japanese Patent No. 3639859), and atom transfer radical polymerization (ATRP) (see Japanese Patent No. 3040172 and WO 2004/013192). Of these living radical polymerization processes, atom transfer radical polymerization is preferable. A more preferred process is atom transfer radical polymerization which uses an organic halide or a halogenated sulfonyl compound as an initiator and is catalyzed by a metal complex having at least one central metal selected from Fe, Ru, Ni and Cu.

Examples of the living anionic polymerization processes include living polymerization using an organic rare earth metal complex as a polymerization initiator (see JP-A-H06-93060), living anionic polymerization performed with an organic alkali metal compound as a polymerization initiator in the presence of a mineral acid salt such as an alkali metal or alkaline earth metal salt (see JP-A-H05-507737), and living anionic polymerization performed with an organic alkali metal compound as a polymerization initiator in the presence of an organoaluminum compound (see JP-A-H11-335432 and WO 2013/141105). Of these living anionic polymerization processes, living anionic polymerization performed with an organic alkali metal compound as a polymerization initiator in the presence of an organoaluminum compound is advantageous in that the (meth) acrylic block copolymer of the present invention can be produced directly and efficiently. For the same reason, a more preferred process is living anionic polymerization performed with an organolithium compound as a polymerization initiator in the presence of an organoaluminum compound and a Lewis base.

Examples of the organolithium compounds include, for example, t-butyllithium, 1,1-dimethylpropyllithium, 1,1-diphenylhexyllithium, 1,1-diphenyl-3-methylpentyllithium, ethyl α-lithioisobutyrate, butyl α-lithioisobutyrate, methyl α-lithioisobutyrate, isopropyllithium, sec-butyllithium, 1-methylbutyllithium, 2-ethylpropyllithium, 1-methylpentyllithium, cyclohexyllithium, diphenylmethyllithium, α-methylbenzyllithium, methyllithium, n-propyllithium, n-butyllithium and n-pentyllithium. From the points of view of availability and anionic polymerization initiating ability, preferred organolithium compounds are those compounds with 3 to 40 carbon atoms which have a chemical structure having a secondary carbon atom as the anionic center, such as isopropyllithium, sec-butyllithium, 1-methylbutyllithium, 1-methylpentyllithium, cyclohexyllithium, diphenylmethyllithium and α-methylbenzyllithium, with sec-butyllithium being particularly preferable. The organolithium compounds may be used singly, or two or more may be used in combination.

The amount in which the organolithium compound is used may be determined relative to the amount of the monomers used, in accordance with the target number average molecular weight of the (meth) acrylic block copolymer.

Examples of the organoaluminum compounds include those organoaluminum compounds represented by the following general formula (A-1) or (A-2).

$$AlR2 (R3) (R4) \quad (A-1)$$

In the general formula (A-1), R2 denotes a monovalent saturated hydrocarbon group, a monovalent aromatic hydrocarbon group, an alkoxy group, an aryloxy group or an N,N-disubstituted amino group, and R3 and R4 each independently denote an aryloxy group or R3 and R4 are bonded to each other to form an arylenedioxy group.

$$AlR5 (R6) (R7) \quad (A-2)$$

In the general formula (A-2), R5 denotes an aryloxy group, and R6 and R7 each independently denote a monovalent saturated hydrocarbon group, a monovalent aromatic hydrocarbon group, an alkoxy group or an N,N-disubstituted amino group.

Examples of the aryloxy groups denoted by R2, R3, R4 and R5 independently in the general formulae (A-1) and (A-2) include, for example, phenoxy group, 2-methylphenoxy group, 4-methylphenoxy group, 2,6-dimethylphenoxy group, 2,4-di-t-butylphenoxy group, 2,6-di-t-butylphenoxy group, 2,6-di-t-butyl-4-methylphenoxy group, 2,6-di-t-butyl-4-ethylphenoxy group, 2,6-diphenylphenoxy group, 1-naphthoxy group, 2-naphthoxy group, 9-phenanthryloxy group, 1-pyrenyloxy group and 7-methoxy-2-naphthoxy group.

Examples of the arylenedioxy groups formed by R3 and R4 bonded to each other in the general formula (A-1) include, for example, functional groups derived from compounds having two phenolic hydroxyl groups by the removal of the hydrogen atoms of the two phenolic hydroxyl groups, such as 2,2'-biphenol, 2,2'-methylenebisphenol, 2,2-methylenebis (4-methyl-6-t-butylphenol), (R)-(+)-1,1'-bi-2-naphthol and (S)-(−)-1,1'-bi-2-naphthol.

The aryloxy groups and the arylenedioxy groups described above may be substituted with a substituent in place of one or more hydrogen atoms. Examples of the substituents include, for example, alkoxy groups such as methoxy group, ethoxy group, isopropoxy group and t-butoxy group; and halogen atoms such as chlorine atom and bromine atom.

Referring to R2, R6 and R7 in the general formulae (A-1) and (A-2), examples of the monovalent saturated hydrocarbon groups include, for example, alkyl groups such as methyl group, ethyl group, n-propyl group, isopropyl group, n-butyl group, isobutyl group, sec-butyl group, t-butyl group, 2-methylbutyl group, 3-methylbutyl group, n-octyl group and 2-ethylhexyl group, and cycloalkyl groups such as cyclohexyl group; examples of the monovalent aromatic hydrocarbon groups include, for example, aryl groups such as phenyl group, and aralkyl groups such as benzyl group; examples of the alkoxy groups include, for example, methoxy group, ethoxy group, isopropoxy group and t-butoxy group; and examples of the N,N-disubstituted amino groups include, for example, dialkylamino groups such as dimethylamino group, diethylamino group and diisopropylamino group, and bis (trimethylsilyl) amino group. The monovalent saturated hydrocarbon groups, the monovalent aromatic hydrocarbon groups, the alkoxy groups and the N,N-disubstituted amino groups described above may be substituted with a substituent in place of one or more hydrogen atoms. Examples of the substituents include, for example, alkoxy groups such as methoxy group, ethoxy group, isopropoxy group and t-butoxy group; and halogen atoms such as chlorine atom and bromine atom.

Examples of the organoaluminum compounds represented by the general formula (A-1) include, for example, ethylbis (2,6-di-t-butyl-4-methylphenoxy) aluminum, ethylbis (2,6-di-t-butylphenoxy) aluminum, ethyl[2,2'-methylenebis (4-methyl-6-t-butylphenoxy)] aluminum, isobutylbis (2,6-di-t-butyl-4-methylphenoxy) aluminum, isobutylbis (2,6-di-t-butylphenoxy) aluminum, isobutyl[2,2'-methylenebis (4-methyl-6-t-butylphenoxy)] aluminum, n-octylbis (2,6-di-t-butyl-4-methylphenoxy) aluminum, n-octylbis (2,6-di-t-butylphenoxy) aluminum, n-octyl[2,2'-methylenebis (4-methyl-6-t-butylphenoxy)] aluminum, methoxybis (2,6-di-t-butyl-4-methylphenoxy) aluminum, methoxybis (2,6-di-t-butylphenoxy) aluminum, methoxy[2,2'-methylenebis (4-methyl-6-t-butylphenoxy)] aluminum, ethoxybis (2,6-di-t-butyl-4-methylphenoxy) aluminum, ethoxybis (2,6-di-t-butylphenoxy) aluminum, ethoxy[2,2'-methylenebis (4-methyl-6-t-butylphenoxy)] aluminum, isopropoxybis (2,6-di-t-butyl-4-methylphenoxy) aluminum, isopropoxybis (2,6-di-t-butylphenoxy) aluminum, isopropoxy[2,2'-methylenebis (4-methyl-6-t-butylphenoxy)] aluminum, t-butoxybis (2,6-di-t-butyl-4-methylphenoxy) aluminum, t-butoxybis (2,6-di-t-butylphenoxy) aluminum, t-butoxy[2,2'-methylenebis (4-methyl-6-t-butylphenoxy)] aluminum, tris (2,6-di-t-butyl-4-methylphenoxy) aluminum and tris (2,6-diphenylphenoxy) aluminum. From points of view such as polymerization initiation efficiency, living properties of polymer end anions, availability and easy handling, preferred compounds are, among others, isobutylbis (2,6-di-t-butyl-4-methylphenoxy) aluminum, isobutylbis (2,6-di-t-butylphenoxy) aluminum and isobutyl[2,2'-methylenebis (4-methyl-6-t-butylphenoxy)] aluminum.

Examples of the organoaluminum compounds represented by the general formula (A-2) include, for example, diethyl (2,6-di-t-butyl-4-methylphenoxy) aluminum, diethyl (2,6-di-t-butylphenoxy) aluminum, diisobutyl (2,6-di-t-butyl-4-methylphenoxy) aluminum, diisobutyl (2,6-di-t-butylphenoxy) aluminum, di-n-octyl (2,6-di-t-butyl-4-methylphenoxy) aluminum and di-n-octyl (2,6-di-t-butylphenoxy) aluminum. The organoaluminum compounds may be used singly, or two or more may be used in combination.

The organoaluminum compound may be used in a suitable amount that is selected appropriately in accordance with factors such as the type of a solvent and other various polymerization conditions. From the point of view of polymerization rate, it is usually preferable that the amount be in the range of 1.0 to 10.0 mol per 1 mol of the organolithium compound, and more preferably in the range of 1.1 to 5.0 mol, and still more preferably in the range of 1.2 to 4.0 mol. Using more than 10.0 mol of the organoaluminum compound per 1 mol of the organolithium compound tends to result in economic disadvantages. If the amount is below 1.0 mol per 1 mol of the organolithium compound, the polymerization initiation efficiency tends to be decreased.

Examples of the Lewis bases include, for example, compounds having an ether bond and/or a tertiary amine structure in the molecule.

Examples of the compounds having an ether bond in the molecule which are used as the Lewis bases include ethers. From the points of view of high polymerization initiation efficiency and living properties of polymer end anions, preferred ethers are cyclic ethers having two or more ether bonds in the molecule or acyclic ethers having one or more ether bonds in the molecule. Examples of the cyclic ethers having two or more ether bonds in the molecule include, for example, crown ethers such as 12-crown-4, 15-crown-5, and 18-crown-6. Examples of the acyclic ethers having one or more ether bonds in the molecule include, for example, acyclic mono ethers such as dimethyl ether, diethyl ether, diisopropyl ether, dibutyl ether and anisole; acyclic diethers such as 1,2-dimethoxyethane, 1,2-diethoxyethane, 1,2-diisopropoxyethane, 1,2-dibutoxyethane, 1,2-diphenoxyethane, 1,2-dimethoxypropane, 1,2-diethoxypropane, 1,2-diisopropoxypropane, 1,2-dibutoxypropane, 1,2-diphenoxypropane, 1,3-dimethoxypropane, 1,3-diethoxypropane, 1,3-diisopropoxypropane, 1,3-dibutoxypropane, 1,3-diphenoxypropane, 1,4-dimethoxybutane, 1,4-diethoxybutane, 1,4-diisopropoxybutane, 1,4-dibutoxybutane and 1,4-diphenoxybutane; and acyclic polyethers such as diethylene glycol dimethyl ether, dipropylene glycol dimethyl ether, dibutylene glycol dimethyl ether, diethylene glycol diethyl ether, dipropylene glycol diethyl ether, dibutylene glycol diethyl ether, triethylene glycol dimethyl ether, tripropylene glycol dimethyl ether, tributylene glycol dimethyl ether, triethylene glycol diethyl ether, tripropylene glycol diethyl ether, tributylene glycol diethyl ether, tetraethylene glycol dimethyl ether, tetrapropylene glycol dimethyl ether, tetrabutylene glycol dimethyl ether, tetraethylene glycol diethyl ether, tetrapropylene glycol diethyl ether and tetrabutylene glycol diethyl ether. From points of view such as side reaction control and availability, acyclic ethers having one or two ether bonds in the molecule are preferable, and diethyl ether or 1,2-dimethoxyethane is more preferable.

Examples of the compounds having a tertiary amine structure in the molecule which are used as the Lewis bases include tertiary polyamines. The tertiary polyamines are compounds having two or more tertiary amine structures in the molecule. Examples of the tertiary polyamines include, for example, chain polyamines such as N,N,N',N'-tetramethylethylenediamine, N,N,N',N'-tetraethylethylenediamine, N,N,N',N'',N''-pentamethyldiethylenetriamine, 1,1,4,7,10,10-hexamethyltriethylenetetramine and tris [2-(dimethylamino) ethyl] amine; nonaromatic heterocyclic compounds such as 1,3,5-trimethylhexahydro-1,3,5-triazine, 1,4,7-trimethyl-1,4,7-triazacyclononane and 1,4,7,10,13,16-hexamethyl-1,4,7,10,13,16-hexaazacyclooctad ecane; and aromatic heterocyclic compounds such as 2,2'-bipyridyl and 2,2':6',2''-terpyridine.

Further, the Lewis base may be a compound which has one or more ether bonds and one or more tertiary amine structures in the molecule. Examples of such compounds include, for example, tris [2-(2-methoxyethoxy) ethyl] amine.

The Lewis bases may be used singly, or two or more may be used in combination.

From points of view such as polymerization initiation efficiency and living properties of polymer end anions, the amount in which the Lewis base is used is preferably in the range of 0.3 to 5.0 mol per 1 mol of the organolithium compound, and is more preferably in the range of 0.5 to 3.0 mol, and still more preferably in the range of 1.0 to 2.0 mol. Using more than 5.0 mol of the Lewis base per 1 mol of the organolithium compound tends to result in economic disadvantages. If the amount is below 0.3 mol per 1 mol of the organolithium compound, the polymerization initiation efficiency tends to be decreased.

The amount of the Lewis base is preferably in the range of 0.2 to 1.2 mol, and more preferably in the range of 0.3 to 1.0 mol per 1 mol of the organoaluminum compound.

The living anionic polymerization is preferably performed in the presence of an organic solvent in order to perform the polymerization at a controlled temperature and to render the system uniform so that the polymerization will take place smoothly. From points of view such as safety, immiscibility with water used for washing of the reaction liquid after the polymerization, and ease in recovery and reuse, preferred organic solvents are, among others, hydrocarbons such as toluene, xylene, cyclohexane and methylcyclohexane; halogenated hydrocarbons such as chloroform, methylene chloride and carbon tetrachloride; and esters such as dimethyl phthalate. The organic solvents may be used singly, or two or more may be used in combination. To ensure that the polymerization will take place smoothly, it is preferable that the organic solvent be dried and be deaerated in the presence of an inert gas beforehand.

In the living anionic polymerization, additives may be added to the reaction system as required. Examples of such additives include, for example, inorganic salts such as lithium chloride; metal alkoxides such as lithium methoxyethoxyethoxide and potassium t-butoxide; tetraethylammonium chloride and tetraethylphosphonium bromide.

The living anionic polymerization is preferably performed at −30 to 25° C. At below −30° C., the polymerization rate is decreased and the productivity tends to be deteriorated. If, on the other hand, the temperature is above 25° C., it tends to be difficult to perform the polymerization of monomers including a methacrylate ester of the general formula (2) with good living properties.

The living anionic polymerization is preferably performed in an atmosphere of an inert gas such as nitrogen, argon or helium. Further, it is preferable that the polymerization be conducted while performing sufficient stirring so that the reaction system will be rendered uniform.

In the living anionic polymerization, the organolithium compound, the organoaluminum compound, the Lewis base and the monomers are preferably added to the reaction system in such a manner that the Lewis base is brought into contact with the organoaluminum compound before contact with the organolithium compound. The organoaluminum compound may be added to the reaction system before or at the same time with the monomers. When the organoaluminum compound and the monomers are added to the reaction system at the same time, the organoaluminum compound may be mixed together with the monomers beforehand and the resultant mixture may be added.

The living anionic polymerization may be terminated by adding to the reaction liquid a polymerization terminator such as a protic compound, for example, methanol; a methanol solution of acetic acid or hydrochloric acid; or an aqueous solution of acetic acid or hydrochloric acid. It is usually preferable that the amount of the polymerization terminator be in the range of 1 to 1,000 mol per 1 mol of the organolithium compound used.

After the termination of the living anionic polymerization, the (meth) acrylic block copolymer may be separated and collected from the reaction liquid by a known method, for example, by a method where the reaction liquid is poured into a poor solvent for the (meth) acrylic block copolymer to cause precipitation, or a method where the (meth) acrylic block copolymer is collected by distilling away the organic solvent from the reaction liquid.

If the (meth) acrylic block copolymer that has been separated and collected contains residual metal components derived from the organolithium compound and the organoaluminum compound, such residual metals may cause problems such as a decrease in the properties of the (meth) acrylic block copolymer, and poor transparency. It is therefore preferable to remove metal components derived from the organolithium compound and the organoaluminum compound after the termination of the living anionic polymerization. Some effective methods for removing such metal components are washing treatment using an acidic aqueous solution, and adsorption treatment using an adsorbent such as ion exchange resin, Celite or activated carbon. Examples of the acidic aqueous solutions which may be used here include, for example, hydrochloric acid, aqueous sulfuric acid solution, aqueous nitric acid solution, aqueous acetic acid solution, aqueous propionic acid solution and aqueous citric acid solution.

In the production of the (meth) acrylic block copolymer of the invention, the partial structure (1) may be introduced by the method in which monomers including a methacrylate ester of the general formula (2) are polymerized to form a methacrylic polymer block (A). An alternative method is such that a polymer block containing a partial structure that is a precursor of the partial structure (1) (hereinafter, the structure will be written as "precursor structure") is formed first and thereafter the precursor structure is converted into the partial structure (1). Such a polymer block containing a precursor structure may be obtained by polymerizing monomers including a compound which has a polymerizable functional group and a precursor structure (hereinafter, the compound will be written as "polymerizable precursor"). Examples of the polymerizable functional groups include, for example, styryl group, 1,3-dienyl group, vinyloxy group and (meth) acryloyl group, with (meth) acryloyl group being preferable. Examples of the precursor structures include hydroxyl groups, hydroxyl groups protected with a protective group (such as a silyloxy group, an acyloxy group or an alkoxy group), amino groups, amino groups protected with a protective group, thiol groups, thiol groups protected with a protective group, and isocyanate groups.

A polymer block which contains a hydroxyl group as the precursor structure may be reacted with a compound which has a partial structure (1) and a partial structure reactive with the hydroxyl group (such as a carboxylic acid, an ester or a carbonyl halide) to form a methacrylic polymer block (A). Further, a polymer block which contains, as the precursor structure, a hydroxyl group protected with a protective group may be deprotected and the resultant hydroxyl group may be reacted in the similar manner as described above to form a methacrylic polymer block (A).

A polymer block which contains an amino group as the precursor structure may be reacted with a compound which has a partial structure (1) and a partial structure reactive with the amino group (such as a carboxylic acid, a carboxylic anhydride, an ester, a carbonyl halide, an aldehyde group or an isocyanate group) to form a methacrylic polymer block (A). Further, a polymer block which contains, as the precursor structure, an amino group protected with a protective group may be deprotected and the resultant amino group may be reacted in the similar manner as described above to form a methacrylic polymer block (A).

A polymer block which contains a thiol group as the precursor structure may be reacted with a compound which has a partial structure (1) and a partial structure reactive with the thiol group (such as a carboxylic acid, a carboxylic anhydride, an ester, a carbonyl halide, an isocyanate group or a carbon-carbon double bond) to form a methacrylic polymer block (A). Further, a polymer block which contains, as the precursor structure, a thiol group protected with a protective group may be deprotected and the resultant thiol group may be reacted in the similar manner as described above to form a methacrylic polymer block (A).

A polymer block which contains an isocyanate group as the precursor structure may be reacted with a compound which has a partial structure (1) and a partial structure reactive with the isocyanate group (such as a hydroxyl group) to form a methacrylic polymer block (A).

In the production of the (meth) acrylic block copolymer of the invention, the methacrylic polymer block (A) is preferably formed by polymerization, typically living anionic polymerization, of monomers including a methacrylate ester of the general formula (2). Such a method is advantageous in that the partial structure (1) maybe introduced easily and directly.

Active Energy Ray Curable Compositions

The (meth) acrylic block copolymer of the invention may be preferably used as a material for an active energy ray curable composition.

The active energy ray curable composition may contain a photopolymerization initiator. Examples of the photopolymerization initiators include, for example, carbonyl compounds such as acetophenones (for example, 1-hydroxycyclohexyl phenyl ketone, 2,2-dimethoxy-1,2-diphenylethan-1-one, 2-hydroxy-2-methyl-1-phenylpropan-1-one and 2-benzyl-2-dimethylamino-1-(4-morpholinophenyl)-1-butanone), benzophenones (for example, benzophenone, benzoylbenzoic acid, hydroxybenzophenone, 3,3'-dimethyl-4-methoxybenzophenone and acrylated benzophenone), Michler's ketones (for example, Michler's ketone) and benzoins (for example, benzoin, benzoin methyl ether and benzoin isopropyl ether); sulfur compounds such as tetramethylthiuram monosulfide and thioxanthones (for example, thioxanthone and 2-chlorothioxanthone); phosphorus compounds such as acylphosphine oxides (for example, 2,4,6-trimethylbenzoyl-diphenylphosphine oxide and bis(2,4,6-trimethylbenzoyl)-phenylphosphine oxide); titanium compounds such as titanocenes (for example, bis (η5-2,4-cyclopentadien-1-yl) -bis(2,6-difluoro-3-(1H-pyr rol-1-yl)-phenyl) titanium); and azo compounds (for example, azobisisobutyronitrile). The photopolymerization initiators may be used singly, or two or more may be used in combination. Of these, acetophenones and benzophenones are preferable.

When the photopolymerization initiator is used, the content thereof is preferably not less than 0.01 part by mass and not more than 10 parts by mass, and more preferably not less than 0.05 parts by mass and not more than 8 parts by mass with respect to 100 parts by mass of the (meth) acrylic block copolymer of the invention. When the content is 0.01 part by mass or above, the active energy ray curable composition tends to attain good curability. When the content is 10 parts by mass or less, cured products that are obtained tend to exhibit good heat resistance.

Further, the active energy ray curable composition may contain a sensitizer as required. Examples of the sensitizers include, for example, n-butylamine, di-n-butylamine, tri-n-butylphosphine, allylthiourea, triethylamine and diethylaminoethyl methacrylate. Of these, diethylaminoethyl methacrylate and triethylamine are preferable.

When the photopolymerization initiator and the sensitizer are used concurrently, the mass ratio of the photopolymerization initiator to the sensitizer is preferably in the range of 10:90 to 90:10, and more preferably in the range of 20:80 to 80:20.

In the active energy ray curable composition of the invention, the content of the (meth) acrylic block copolymer maybe controlled appropriately in accordance with factors such as the target use application. From the point of view of mechanical characteristics, the content is preferably not less than 1 mass %, more preferably not less than 10 mass %, and still more preferably not less than 30 mass %, and is preferably not more than 99 mass %, more preferably not more than 80 mass %, and still more preferably not more than 70 mass %. The content may be 100 mass %.

The active energy ray curable composition of the invention may further include a solvent. The addition of a solvent can control the viscosity and enhance the application properties. Further, the addition of a solvent facilitates the dissolution or dispersing of the components in the active energy ray curable composition.

Examples of the solvents include, for example, aromatic hydrocarbons such as benzene, toluene and chlorobenzene; aliphatic or alicyclic hydrocarbons such as pentane, hexane, cyclohexane and heptane; halogenated hydrocarbons such as carbon tetrachloride, chloroform and ethylene dichloride; nitro compounds such as nitromethane and nitrobenzene; ethers such as diethyl ether, methyl t-butyl ether, tetrahydrofuran and 1,4-dioxane; esters such as methyl acetate, ethyl acetate, isopropyl acetate, butyl acetate and amyl acetate; amides such as dimethylformamide; alcohols such as methanol, ethanol and propanol; and ketones such as acetone, methyl ethyl ketone and cyclohexanone.

When the solvent is added, the content thereof with respect to 100 parts by mass of the (meth) acrylic block copolymer used in the present invention is preferably not less than 1 part by mass, more preferably not less than 10 parts by mass, and still more preferably not less than 30 parts by mass, and is preferably not more than 500 parts by mass, more preferably not more than 300 parts by mass, and still more preferably not more than 200 parts by mass.

While still achieving the advantageous effects of the invention, the active energy ray curable composition may contain a reactive diluent which is other than the (meth) acrylic block copolymers of the invention and exhibits polymerizability when irradiated with active energy rays. Such reactive diluents are not particularly limited and may be any types of compounds that exhibit polymerizability when irradiated with active energy rays. Examples include, for example, styrene derivatives such as styrene, indene, p-methylstyrene, α-methylstyrene, p-methoxystyrene, p-t-butoxystyrene, p-chloromethyl styrene, p-acetoxystyrene and divinylbenzene; fatty acid vinyl esters such as vinyl acetate, vinyl propionate, vinyl butyrate, vinyl caproate, vinyl benzoate and vinyl cinnamate; (meth) acrylic acid derivatives such as methyl (meth) acrylate, ethyl (meth) acrylate, n-propyl (meth) acrylate, isopropyl (meth) acrylate, n-butyl (meth) acrylate, amyl (meth) acrylate, isobutyl (meth) acrylate, t-butyl (meth) acrylate, pentyl (meth) acrylate, isoamyl (meth) acrylate, hexyl (meth) acrylate, heptyl (meth) acrylate, n-octyl (meth) acrylate, isooctyl (meth) acrylate, 2-ethylhexyl (meth) acrylate, nonyl (meth) acrylate, decyl (meth) acrylate, isodecyl (meth) acrylate, undecyl (meth) acrylate, dodecyl (meth) acrylate, stearyl (meth) acrylate, isostearyl (meth) acrylate, benzyl (meth) acrylate, isobornyl (meth) acrylate, bornyl (meth) acrylate, tricyclodecanyl (meth) acrylate, dicyclopentanyl (meth) acrylate, dicyclopentenyloxyethyl (meth) acrylate, 4-butylcyclohexyl (meth) acrylate, 2-hydroxyethyl (meth) acrylate, 2-hydroxypropyl (meth) acrylate, 2-hydroxybutyl (meth) acrylate, 4-hydroxybutyl (meth) acrylate, tetrahydrofurfuryl (meth) acrylate, butoxyethyl (meth) acrylate, ethoxydiethylene glycol (meth) acrylate, phenoxyethyl (meth) acrylate, polyethylene glycol mono (meth) acrylate ester, polypropylene glycol mono (meth) acrylate ester, methoxyethylene glycol (meth) acrylate, ethoxyethyl (meth) acrylate, methoxypolyethylene glycol (meth) acrylate, methoxypolypropylene glycol (meth) acrylate, dimethylaminoethyl (meth) acrylate, diethylaminoethyl (meth) acrylate, 7-amino-3,7-dimethyloctyl (meth) acrylate, 4-(meth) acryloylmorpholine, trimethylolpropane tri (meth) acrylate, trimethylolpropane ethoxytri (meth) acrylate, pentaerythritol tri (meth) acrylate, ethylene glycol di (meth) acrylate, triethylene glycol di (meth) acrylate, tetraethylene glycol di (meth) acrylate, tricyclodecanediyldimethanol di (meth) acrylate, polyethylene glycol di (meth) acrylate, 1,4-butanediol di (meth) acrylate, 1,6-hexanediol di (meth) acrylate, neopentyl glycol di (meth) acrylate, tripropylene glycol di (meth) acrylate, adduct of bisphenol A diglycidyl ether with (meth) acrylic acid at both ends, pentaerythritol tetra (meth) acrylate, 2,4,6-trioxohexahydro-1,3,5-triazine-1,3,5-trisethanol tri (meth) acrylate, N,N'-bis [2-((meth) acryloyloxy) ethyl]-N''-(2-hydroxyethyl)-1, 3,5-triazine-2,4,6(1H,3H,5H)-trione, tricyclodecanedimethanol di (meth) acrylate, di (meth) acrylate of a diol that is an adduct of bisphenol A with ethylene oxide or propylene oxide, di (meth) acrylate of a diol that is an adduct of hydrogenated bisphenol A with ethylene oxide or propylene oxide, epoxy (meth) acrylate that is an adduct of bisphenol A diglycidyl ether with (meth) acrylate, and cyclohexanedimethanol di (meth) acrylate; epoxy acrylate resins such as bisphenol A epoxy acrylate resin, phenol novolak epoxy acrylate resin and cresol novolak epoxy acrylate resin; carboxyl group-modified epoxy acrylate resins; urethane acrylate resins obtained by the reaction of a urethane resin formed between a polyol (such as polytetramethylene glycol, polyester diol of ethylene glycol and adipic acid, ε-caprolactone-modified polyester diol, polypropylene glycol, polyethylene glycol, polycarbonate diol, hydroxyl-terminated hydrogenated polyisoprene, hydroxyl-terminated polybutadiene or hydroxyl-terminated polyisobutylene) and an organic isocyanate (such as tolylene diisocyanate, isophorone diisocyanate, diphenylmethane diisocyanate, hexamethylene diisocyanate or xylylene diisocyanate), with a hydroxyl group-containing (meth) acrylate (such as hydroxyethyl (meth) acrylate, hydroxypropyl (meth) acrylate, hydroxybutyl (meth)acrylate or pentaerythritol triacrylate); resins obtained by introducing a (meth) acryloyl group to the above polyols via an ester bond; polyester acrylate resins; and epoxy compounds such as epoxidized soybean oil and benzyl epoxystearate. From the point of view of curability, acrylate monomers such as n-octyl acrylate, isooctyl acrylate and 2-ethylhexyl acrylate are preferably used. The reactive diluents may be used singly, or two or more may be used in combination.

When the active energy ray curable composition contains the reactive diluent, the content thereof with respect to 100 parts by mass of the (meth) acrylic block copolymer of the invention is preferably not less than 5 parts by mass, and more preferably not less than 20 parts by mass, and is preferably not more than 900 parts by mass, more preferably not more than 400 parts by mass, and still more preferably not more than 150 parts by mass. When the content is 5 parts by mass or more, the active energy ray curable composition attains a lower viscosity. When the content is 900 parts by mass or less, the active energy ray curable composition tends to exhibit a higher curing rate and to attain more excellent flexibility of cured products.

The active energy ray curable composition may contain various additives free from active energy ray curable groups, such as plasticizers, tackifiers, softeners, fillers, stabilizers, pigments and dyes, while still ensuring that the curability of the composition will not be significantly impaired.

The plasticizers may be added to the active energy ray curable composition for purposes such as, for example, to control the viscosity of the active energy ray curable composition and to control the mechanical strength of cured products obtained by curing the active energy ray curable composition. Examples of the plasticizers include, for example, phthalate esters such as dibutyl phthalate, diheptyl phthalate, di (2-ethylhexyl) phthalate and butyl benzyl phthalate; nonaromatic dibasic acid esters such as dioctyl adipate, dioctyl sebacate, dibutyl sebacate and isodecyl succinate; aliphatic esters such as butyl oleate and methyl acetylricinoleate; esters of polyalkylene glycols such as diethylene glycol dibenzoate, triethylene glycol dibenzoate and pentaerythritol ester; phosphate esters such as tricresyl phosphate and tributyl phosphate; trimellitate esters; diene (co) polymers such as polybutadiene, butadiene-acrylonitrile copolymer and polychloroprene; polybutene; polyisobutylene; chlorinated paraffins; hydrocarbon oils such as alkyldiphenyls and partially hydrogenated terphenyls; process oils; polyethers such as polyether polyols, for example, polyethylene glycol, polypropylene glycol and polytetramethylene glycol, and derivatives obtained by converting hydroxyl groups of the polyether polyols into ester groups, ether groups or the like; and polyesters obtained from a dibasic acid such as sebacic acid, adipic acid, azelaic acid or phthalic acid, and a dihydric alcohol such as ethylene glycol, diethylene glycol, triethylene glycol, propylene glycol or dipropylene glycol. The term "(co) polymers" indicates both homopolymers and copolymers. The plasticizers may be used singly, or two or more may be used in combination.

The molecular weight or number average molecular weight of the plasticizers is preferably 400 to 15,000, more preferably 800 to 10,000, and still more preferably 1,000 to 8,000. The plasticizers may contain functional groups other than active energy ray curable groups (such as, for example, hydroxyl groups, carboxyl groups and halogen groups) or may be free from such functional groups. By virtue of the molecular weight or number average molecular weight of the plasticizer being 400 or above, the plasticizer does not bleed out with time from a cured product of the active energy ray curable composition and thus it is possible to maintain initial properties over a long term. By virtue of the molecular weight or number average molecular weight of the plasticizer being 15,000 or less, the active energy ray curable composition tends to exhibit good handleability.

When the plasticizer is added to the active energy ray curable composition, the content thereof is preferably 5 to 150 parts by mass, more preferably 10 to 120 parts by mass, and still more preferably 20 to 100 parts by mass with respect to 100 parts by mass of the (meth) acrylic block copolymer of the invention. When added in 5 parts by mass or more, the plasticizer tends to offer marked effects in, for example, the control of properties and characteristics. When the content is 150 parts by mass or less, cured products obtained by curing the active energy ray curable composition tend to attain excellent mechanical strength.

The tackifiers may be added to the active energy ray curable composition for purposes such as, for example, to impart tackiness to cured products obtained from the active energy ray curable composition. Examples of the tackifiers include, for example, tackifier resins such as coumarone-indene resins, phenolic resins, p-t-butylphenol-acetylene resins, phenol-formaldehyde resins, xylene-formaldehyde resins, aromatic hydrocarbon resins, aliphatic hydrocarbon resins (for example, terpene resins), styrene resins (for example, polystyrene and poly-α-methylstyrene), polyhydric alcohol rosin esters, hydrogenated rosins, hydrogenated wood rosins, esters of hydrogenated rosins with monoalcohols or polyhydric alcohols, and turpentine tackifier resins. In particular, preferred tackifiers are aliphatic hydrocarbon resins, polyhydric alcohol rosin esters, hydrogenated rosins, hydrogenated wood rosins, and esters of hydrogenated rosins with monoalcohols or polyhydric alcohols.

When the tackifier is added to the active energy ray curable composition, the content thereof is preferably 5 to 150 parts by mass, more preferably 10 to 120 parts by mass, and still more preferably 20 to 100 parts by mass with respect to 100 parts by mass of the (meth) acrylic block copolymer of the invention. When added in 5 parts by mass or more, the tackifier tends to provide cured products with significant tackiness. When the content is 150 parts by mass or less, cured products tend to attain more excellent flexibility.

The additives free from active energy ray curable groups may be organic compounds or inorganic compounds.

To cure the (meth) acrylic block copolymer of the invention, or the active energy ray curable composition including the (meth) acrylic block copolymer, active energy rays may be applied with known devices. In the case of electron beams (EB), the accelerating voltage and the dosage are appropriately in the range of 0.1 to 10 MeV and in the range of 1 to 500 kGy, respectively.

Ultraviolet lights may be applied using devices such as high-pressure mercury lamps, ultrahigh-pressure mercury lamps, carbon arc lamps, metal halide lamps, xenon lamps, chemical lamps and LEDs which each emit 150-450 nm wavelength lights. The cumulative dose of the active energy rays is usually in the range of 10 to 20,000 $mJ/cm^2$, and preferably in the range of 30 to 10,000 $mJ/cm^2$. Irradiation with less than 10 $mJ/cm^2$ tends to result in insufficient curing of the (meth) acrylic block copolymer. The (meth) acrylic block copolymer may be degraded if the cumulative dose is greater than 20,000 $mJ/cm^2$.

When the (meth) acrylic block copolymer of the invention, or the active energy ray curable composition including the (meth) acrylic block copolymer is irradiated with active energy rays, the irradiation preferably takes place at a relative humidity of not more than 30%, and more preferably not more than 10% to prevent the decomposition of the (meth) acrylic block copolymer.

During or after the irradiation with active energy rays of the (meth) acrylic block copolymer of the invention, or the active energy ray curable composition including the (meth) acrylic block copolymer, heating may be performed as required to promote curing. The heating temperature is preferably in the range of 40 to 130° C., and more preferably in the range of 50 to 100° C.

Examples of the use applications of the active energy ray curable compositions of the invention include curable resins, adhesives, pressure-sensitive adhesives, tapes, films, sheets, mats, sealing materials, sealants, coating materials, potting materials, inks, printing plate materials, vibration-insulating materials, foams, heat radiators, prepregs, gaskets and packings used in such fields as automobiles, home appliances, buildings, civil engineering, sports, displays, optical recording devices, optical equipment, semiconductors, batteries and printing.

EXAMPLES

The present invention will be described in greater detail based on Examples hereinbelow. However, it should be construed that the scope of the invention is not limited to such Examples.

In Examples, BMA, AMA, MMA, 2-EHA and BA represent 3-methyl-3-butenyl methacrylate, allyl methacrylate, methyl methacrylate, 2-ethylhexyl acrylate and butyl acrylate, respectively.

In Examples and Comparative Examples below, raw materials that were used had been dried and purified by known methods and deaerated in nitrogen. They were transferred and fed in a nitrogen atmosphere.

Monomer Consumption Rate

In Examples and Comparative Examples described later, the rate of consumption of a monomer after polymerization was calculated in the following manner. 0.5 mL of the reaction liquid was sampled and was added to 0.5 mL of methanol, and these were mixed together. A 0.1 mL portion of the mixture liquid was sampled and was dissolved into 0.5 mL of deuterated chloroform. The solution was analyzed by $^1$H-NMR under the conditions described later. The consumption rate was calculated based on the change in the ratio of the integral of a peak assigned to the protons directly bonded to the carbon-carbon double bond of the (meth) acrylate ester used as the monomer (chemical shift 5.79-6.37 ppm) to the integral of a peak assigned to the protons directly bonded to the aromatic ring of toluene used as the solvent (chemical shift 7.00-7.38 ppm).

$^1$H-NMR Measurement Conditions

Apparatus: Nuclear magnetic resonance apparatus "JNM-ECX400" manufactured by JEOL Ltd.
Temperature: 25° C.

Number Average Molecular Weight (Mn), Weight Average Molecular Weight (Mw) and Molecular Weight Distribution (Mw/Mn)

A polymer obtained in Example or Comparative Example described later was analyzed by GPC under the following conditions to determine the number average molecular weight (Mn) and the weight average molecular weight (Mw) relative to standard polystyrenes, and the molecular weight distribution (Mw/Mn) was calculated.

GPC Measurement Conditions

Apparatus: GPC apparatus "HLC-8220GPC" manufactured by TOSOH CORPORATION
Separation columns: "TSKgel Super Multipore HZ-M (column diameter=4.6 mm, column length=15 cm)" manufactured by TOSOH CORPORATION (Two columns were connected in series.)
Eluent: Tetrahydrofuran
Eluent flow rate: 0.35 mL/min
Column temperature: 40° C.
Detection method: Differential refractive index (RI)

Curing Rate (Reaction Degree)

The curing rate of an active energy ray curable composition obtained in Example or Comparative Example described below was evaluated with a viscosity/viscoelasticity measuring device (MARS III manufactured by HAAKE).

Onto parallel plates having a diameter of 20 mm, 1 g of the active energy ray curable composition obtained in Example or Comparative Example was dropped to form a film. The measurement mode was high-speed OSC time dependent measurement mode. The viscoelasticity was measured at a measurement temperature of 25° C., a measurement gap of 0.30 mm and a measurement frequency of 1 Hz while irradiating the film with UV light from a UV lamp (Omni Cure Series 2000 manufactured by Lumen Dynamics, intensity 50 mW/cm$^2$).

As an index of curing rate, the reaction degree (%) was obtained using the following equation wherein G' (0) was the storage shear modulus (Pa) at the start of UV application, G' (20) the storage shear modulus (Pa) after 20 seconds from the start of UV application (after application of 1000 mJ/cm$^2$), and G' (120) the storage shear modulus (Pa) saturated in 120 seconds from the start of UV application (after application of 6000 mJ/cm$^2$).

Reaction degree (%)={G'(20)−G'(0)}/{G'(120)−G'(0)}×100

Example 1

Step (1)

The inside of a 3 L flask was dried and purged with nitrogen, and 1.30 kg of toluene was added thereto. While performing stirring of the solution in the flask, there were sequentially added 1.5 g of N,N,N',N'',N''-pentamethyldiethylenetriamine as a Lewis base and 20 g of a 26 mass % toluene solution of isobutylbis (2,6-di-t-butyl-4-methylphenoxy) aluminum as an organoaluminum compound. The mixture was cooled to −30° C. Further, 3.7 g of a 10 mass % cyclohexane solution of sec-butyllithium as an organolithium compound was added, followed by the addition at once of 6.9 g of a monomer mixture which included 3.0 g of BMA and 3.9 g of MMA. Anionic polymerization was thus initiated. Subsequently, the reaction liquid was stirred at −30° C. for 12 hours, and the reaction liquid was sampled.

In Step (1), the rates of consumption of BMA and MMA were 100%.

Step (2)

Subsequently, while performing stirring of the reaction liquid at −30° C., 445 g of 2-EHA monomer was added at a rate of 5 g/min. Immediately after the completion of the addition of the monomer, the reaction liquid was sampled.

In Step (2), the rate of consumption of 2-EHA was 100%.

Step (3)

Subsequently, while performing stirring of the reaction liquid at −30° C., there was added at once 6.0 g of a monomer mixture which included 2.6 g of BMA and 3.4 g of MMA. The temperature was increased to 25° C. The reaction liquid was sampled after 300 minutes from the addition of the mixture.

In Step (3), the rates of consumption of BMA and MMA were 100%.

Step (4)

The anionic polymerization was terminated by adding 40 g of methanol while continuously stirring the reaction liquid at 25° C. A solution was thus obtained which contained a (meth) acrylic block copolymer that was a triblock copolymer composed of a methacrylic polymer block (A), an acrylic polymer block (B) and a methacrylic polymer block (A) linked in this order (A-B-A). The (meth) acrylic block copolymer sampled from the solution had a Mn of 71,000 and a Mw/Mn of 1.03.

Step (5)

Next, the solution obtained above was poured into 5,000 g of methanol to precipitate an oily precipitate. The oily precipitate was recovered and dried to give 420 g of the (meth) acrylic block copolymer (hereinafter, written as the "(meth) acrylic block copolymer ⟨1⟩").

Step (6)

Next, 20 g of n-octyl acrylate as a reactive diluent and 5 g of 1-hydroxycyclohexyl phenyl ketone (IRGACURE (registered trademark) 184 manufactured by Ciba Specialty Chemicals) as a photopolymerization initiator were added to 80 g of the (meth)acrylic block copolymer ⟨1⟩. The mixture was stirred to give a solution. Thus, 105 g of an active energy ray curable composition was obtained. The curing rate of the active energy ray curable composition was measured by the method described earlier, and the reaction degree was determined to be 94.0%. The result is described in Table 2.

Example 2

A (meth) acrylic block copolymer was obtained in the same manner as in Example 1, except that the amounts of BMA, MMA, 2-EHA and BA used in Steps (1) to (3) were changed as described in Table 1. The (meth) acrylic block copolymer obtained will be written as the (meth) acrylic block copolymer ⟨2⟩.

Further, an active energy ray curable composition including the (meth) acrylic block copolymer ⟨2⟩ was obtained in the same manner as in Example 1, except that the amounts of n-octyl acrylate and 1-hydroxycyclohexyl phenyl ketone used in Step (6) were changed as described in Table 2.

Comparative Examples 1 and 2

(Meth) acrylic block copolymers were obtained in the same manner as in Example 1, except that the amounts of BMA, AMA, MMA, 2-EHA and BA used in Steps (1) to (3) were changed as described in Table 1. The (meth) acrylic block copolymers obtained in Comparative Examples 1 and 2 will be written as the (meth) acrylic block copolymers ⟨3⟩ and ⟨4⟩, respectively.

Further, active energy ray curable compositions including the (meth) acrylic block copolymer ⟨3⟩ or ⟨4⟩ were obtained in the same manner as in Example 1, except that the amounts of n-octyl acrylate and 1-hydroxycyclohexyl phenyl ketone used in Step (6) were changed as described in Table 2.

TABLE 1

| | | | Ex. 1 | Ex. 2 | Comp. Ex. 1 | Comp. Ex. 2 |
|---|---|---|---|---|---|---|
| (Meth)acrylic block copolymer | | | (1) | (2) | (3) | (4) |
| Step (1) | Amounts (g) | BMA | 3.0 | 2.0 | — | — |
| | | AMA | — | — | 2.4 | 1.6 |
| | | MMA | 3.9 | 110 | 3.9 | 110 |
| Step (2) | Amounts (g) | 2-EHA | 450 | — | 450 | — |
| | | BA | — | 240 | — | 240 |
| Step (3) | Amounts (g) | BMA | 2.6 | 1.6 | — | — |
| Step (4) | | AMA | — | — | 2.1 | 1.3 |
| | | MMA | 3.4 | 93 | 3.4 | 93 |
| Number average molecular weight (Mn) | | | 71 × 10$^3$ | 50 × 10$^3$ | 72 × 10$^3$ | 53 × 10$^3$ |
| Molecular weight distribution (Mw/Mn) | | | 1.03 | 1.14 | 1.04 | 1.06 |

*) In Table 1, BMA, AMA, MMA, 2-EHA and BA represent 3-methyl-3-butenyl methacrylate, allyl methacrylate, methyl methacrylate, 2-ethylhexyl acrylate and butyl acrylate, respectively.

TABLE 2

|  | Ex. 1 | Ex. 2 | Comp. Ex. 1 | Comp. Ex. 2 |
|---|---|---|---|---|
| (Meth)acrylic block copolymer | (1) | (2) | (3) | (4) |
| (parts by mass) | 80 | 50 | 80 | 50 |
| n-Octyl acrylate (parts by mass) | 20 | 50 | 20 | 50 |
| IRGACURE 184 (parts by mass) | 5 | 5 | 5 | 5 |
| Reaction degree (%) | 94.0 | 90.2 | 48.8 | 44.5 |

As clear from Table 2, high curing rates were achieved by the active energy ray curable compositions of Examples 1 and 2 in which the methacrylic polymer blocks (A) contained BMA as monomer units having an active energy ray curable group with a partial structure (1). A reason for this is probably because the hydrocarbon group (the α-methyl group) represented by $R^1$ in the general formula (1) was electron donating and consequently the active energy ray curable group attained higher reactivity.

In contrast, the curing rate was low in the active energy ray curable compositions of Comparative Examples 1 and 2 in which the methacrylic polymer blocks (A) contained no monomer units having an active energy ray curable group with a partial structure (1). A reason for this is probably because the allyl group that was the active energy ray curable group did not have an electron-donating hydrocarbon group at the α position and consequently the reactivity of the active energy ray curable group was low.

From the foregoing, the (meth) acrylic block copolymers of the present invention have been shown to have excellent active energy ray curability, in particular, curability of blends thereof with acrylate monomers.

INDUSTRIAL APPLICABILITY

The block copolymers of the present invention are useful as active energy ray curable compositions which are cured by the irradiation with active energy rays such as UV lights or electron beams.

The invention claimed is:

1. A (meth)acrylic block copolymer, comprising:
   a methacrylic polymer block (A) having an active energy ray curable group including a partial structure (1) of formula (1) below; and
   an acrylic polymer block (B) having no active energy ray curable groups, wherein the acrylic polymer block (B) has a content of 30 to 99 mass % based on a total weight of the (meth)acrylic block copolymer,

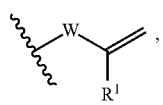

(1)

wherein $R^1$ denotes a hydrocarbon group having 1 to 10 carbon atoms,
   wherein W denotes a saturated hydrocarbon group having 1 to 10 carbon atoms,
   wherein the acrylic polymer block (B) comprises monomer units derived from at least one acrylate ester selected from the group consisting of methyl acrylate, ethyl acrylate, n-propyl acrylate, isopropyl acrylate, n-butyl acrylate, t-butyl acrylate, n-hexyl acrylate, n-heptyl acrylate, 2-ethylhexyl acrylate, n-octyl acrylate, isooctyl acrylate, isobornyl acrylate, dodecyl acrylate, cyclohexyl acrylate, 2-methoxyethyl acrylate, 2-methoxypropyl acrylate, 3-methoxypropyl acrylate, 2-methoxybutyl acrylate, 4-methoxybutyl acrylate, 2-ethoxyethyl acrylate, 3-ethoxypropyl acrylate, 4-ethoxybutyl acrylate, methoxydiethylene glycol acrylate, ethoxydiethylene glycol acrylate, methoxytriethylene glycol acrylate, ethoxytriethylene glycol acrylate, methoxydipropylene glycol acrylate, ethoxydipropylene glycol acrylate, methoxytripropylene glycol acrylate, ethoxytripropylene glycol acrylate, trimethoxysilylpropyl acrylate, phenyl acrylate, naphthyl acrylate, 2-(trimethylsilyloxy)ethyl acrylate and 3-(trimethylsilyloxy)propyl acrylate, and
   wherein the monomer units derived from the at least one acrylate ester have a content of 90 to 100 mass % relative to all monomer units of the acrylic polymer block (B).

2. The (meth)acrylic block copolymer according to claim 1, wherein the proportion of the number of moles of the partial structures (1) relative to the number of moles of all monomer units constituting the methacrylic polymer block (A) is 0.1 to 50 mol %.

3. An active energy ray curable composition comprising the (meth)acrylic block copolymer of claim 1.

4. The (meth)acrylic block copolymer according to claim 1, wherein the methacrylic polymer block (A) comprises monomer units derived from a methacrylate ester of formula (2) below:

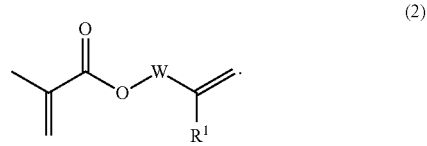

(2)

5. The (meth)acrylic block copolymer according to claim 4, wherein the monomer units derived from the methacrylate ester of the formula (2) has a content of 0.1 to 50 mol % relative to a total number of moles of all monomer units constituting the methacrylic polymer block (A).

6. The (meth)acrylic block copolymer according to claim 1, wherein the methacrylic polymer block (A) has a number average molecular weight of 500 to 100,000.

7. The (meth)acrylic block copolymer according to claim 1, wherein the acrylic polymer block (B) has a number average molecular weight of 3,000 to 300,000.

8. The (meth)acrylic block copolymer according to claim 1, wherein the (meth)acrylic block copolymer has a number average molecular weight of 4,000 to 400,000.

9. The (meth)acrylic block copolymer according to claim 1, wherein the methacrylic polymer block (A) has a content of 1 to 70 mass % based on the total weight of the (meth)acrylic block copolymer.

* * * * *